Nov. 25, 1924.

C. H. ROBINSON

TIRE CLAMP

Filed July 23, 1923

Inventor
Charles H. Robinson

Attorney

Nov. 25, 1924.
C. H. ROBINSON
TIRE CLAMP
Filed July 23, 1923   2 Sheets-Sheet 2
1,516,687
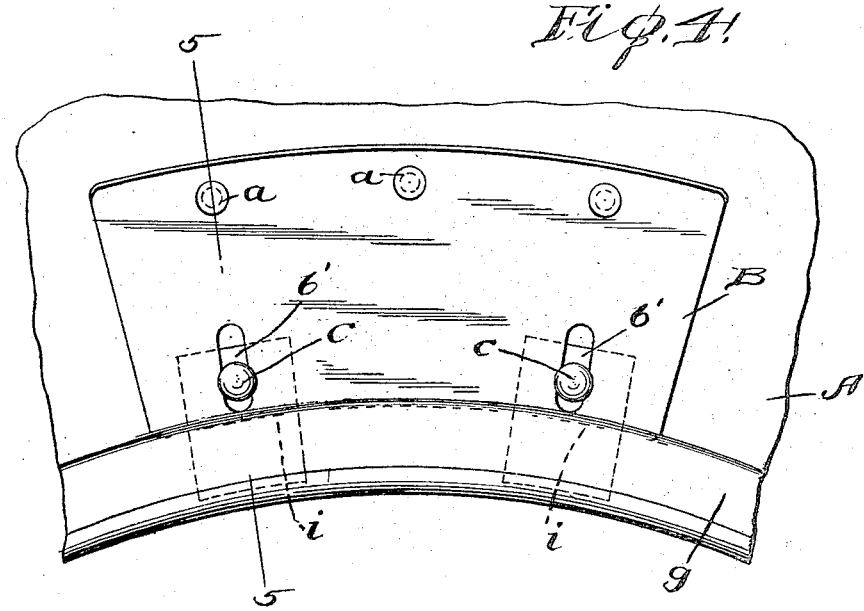
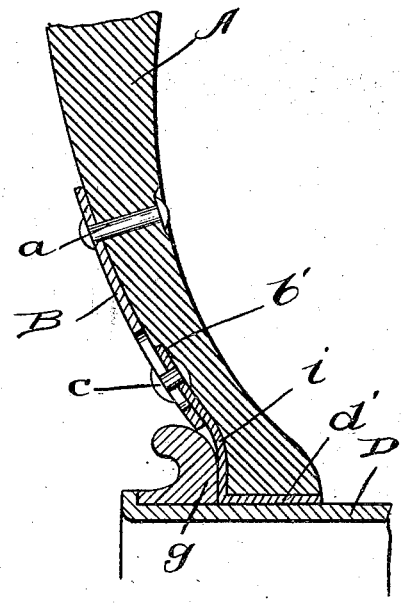
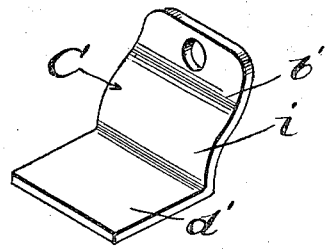
Inventor
Charles H. Robinson
Attorney Patented Nov. 25, 1924.

1,516,687

UNITED STATES PATENT OFFICE.

CHARLES H. ROBINSON, OF MIAMI, OKLAHOMA.

TIRE CLAMP.

Application filed July 23, 1923. Serial No. 653,246.

*To all whom it may concern:*

Be it known that I, CHARLES H. ROBINSON, a citizen of the United States, residing at Miami, in the county of Ottawa and State of Oklahoma, have invented certain new and useful Improvements in Tire Clamps, of which the following is a specification.

This invention relates to new and useful improvements in tire clamps and has for its principal object to provide a device of this character which will permit a rim cut tire casing from blowing out while in use.

With the foregoing and other objects in view that will appear as the nature of my invention is better understood, the same consists in the novel features of construction, combination and arrangement of parts illustrated in the drawings and more particularly pointed out in the appended claims.

In the accompanying drawings, which are for illustrative purposes only and are therefore not drawn to scale:—

Figure 4 is a fragmentary elevation, illustrating the application of my invention to a tire casing of the straight edge type.

Figure 5 is a vertical transverse section, taken on line 5—5 of Figure 4 and Figure 6 is a detail perspective view of one of the fastening clips used with a tire casing of the straight edge type.

Figure 1:
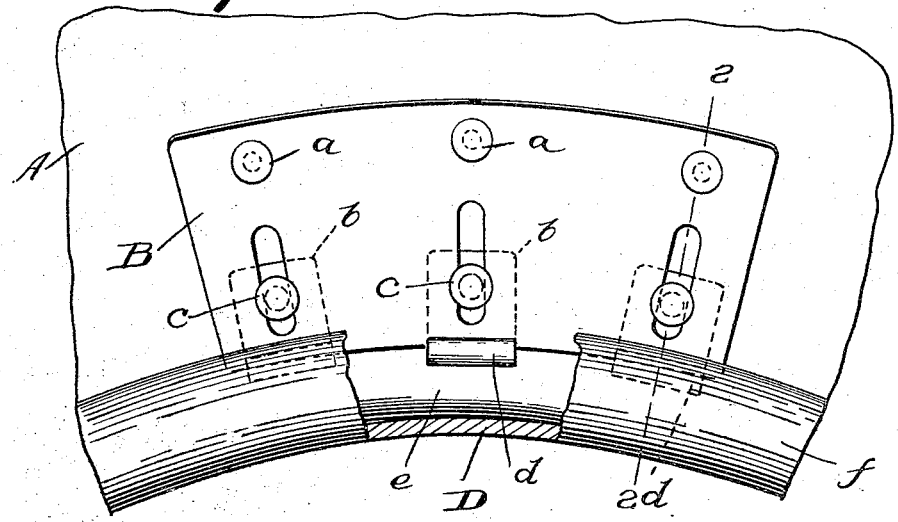
Figure 1 is a detail fragmentary elevation, partly in section, illustrating the application of my invention to a tire casing of the clincher type.
Figure 2:
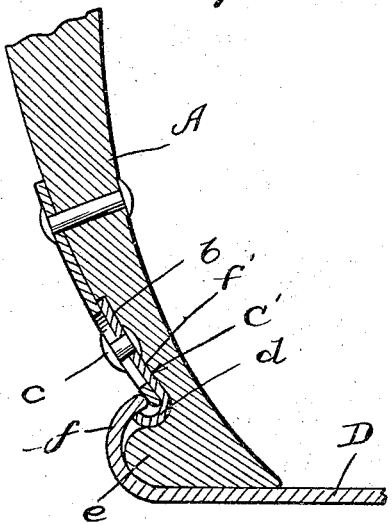
Figure 2 is a vertical transverse section taken on line 2—2 of Figure 1.
Figure 3:
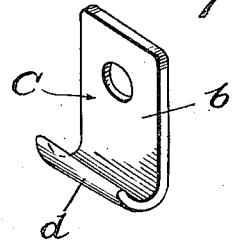
Figure 3 is a detail perspective view of one of the fastening clips used with a tire casing of the clincher type.

Referring to the drawings for a more particular description of my invention and in which drawings like parts are designated by like reference characters throughout the several views, A designates a tire casing of the clincher type, B the tire clamps and C the fastening clips. The tire clamp B is in the form of an elongated strip or piece of metal that conforms to both the circumferential and transverse curvature of the tire casing B and fits over the outer surface thereof with its inner edge extending over the rim cut and below the clincher flange $f$ of the rim D. The outer edge of the tire clamp is secured to the tire casing by the rivets $a$ and the inner edge thereof secured to the clips C, consisting of the straight outer portions $b$ riveted or otherwise fastened, as at $c$, to the tire clamp and the outwardly curved inner portions $d$ which hook or fit over the head $e$ of the casing inside of the clincher flange $f$ of the rim D. It will be noted that the straight portions $b$ of the clips C fit against the inner walls or faces of the tire clamps B and preferably in corresponding recesses $f'$ in the outer wall of the tire casing.

In the form of my invention illustrated in Figures 4 to 6, inclusive, the fastening clips C are formed with straight inwardly and right-angularly bent portions $d'$. This form of my device is used in connection with a tire casing of the straight edge type and, as shown, the inner portions $d'$ of the fastening clips C fit under the inner edge of the tire casing A, the intermediate portions $i$ between the casing and clincher ring $g$ and the outer portions $b'$ between the casing and tire clamps B.

My invention is simple and economical in construction and through its employment, rim cut tire casings will be prevented from blowing out while in use. From the foregoing description taken in connection with the drawings, it is thought that the construction, operation and advantages of my invention will be readily understood without requiring a more extended explanation.

Having described my invention, what I claim as new and desire to secure by Letters Patent, is:—

1. A clamp for rim cut tire casings consisting of a single elongated strip of metal fitting over the outer surface of the casing with its inner edge extending over the rim cut, said clamp conforming to the transverse and circumferential curvature of the tire, rivets for rigidly securing the outer edge of the clamp to the casing and a series of independent longitudinally spaced fastening clips for securing the inner edge of the clamp to the casing, said clips arranged with their outer ends extending under and rigidly fastened to the inner edge of the clamp and their inner ends extending inwardly beyond the inner edge of the clamp and engaging the tire casing.

2. A clamp for rim cut tire casings consisting of a single elongated strip of metal fitting over the outer surface of the casing with its inner edge extending over the rim cut, said clamp conforming to the transverse and circumferential curvature of the tire, rivets for rigidly securing the outer edge of the clamp to the casing and a series of longitudinally spaced fastening clips for securing the inner edge of the clamp to the casing, said clips comprising straight outer portions, which extend under and are rigidly secured to the inner edge of the clamp and outwardly curved inner portions which fit over one bead of the casing inside the adjacent clincher flange of the tire rim.

In testimony whereof I affix my signature.

CHARLES H. ROBINSON.